(12) United States Patent
Taylor et al.

(10) Patent No.: US 8,202,401 B2
(45) Date of Patent: *Jun. 19, 2012

(54) METHODS AND APPARATUS FOR DISTILLATION USING PHASE CHANGE ENERGY

(75) Inventors: David B. Taylor, San Diego, CA (US); Stephen R. Topaz, St. Helens, OR (US)

(73) Assignee: Hydrologic Industries, Inc., San Diego, CA (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/936,657

(22) Filed: Nov. 7, 2007

(65) Prior Publication Data

US 2008/0105534 A1    May 8, 2008

Related U.S. Application Data

(60) Provisional application No. 60/864,899, filed on Nov. 8, 2006.

(51) Int. Cl.
  *B01D 1/28* (2006.01)
  *B01D 3/10* (2006.01)
  *B01D 5/00* (2006.01)
  *C02F 1/04* (2006.01)

(52) U.S. Cl. ........ 202/182; 159/24.1; 159/26.2; 159/44; 159/DIG. 16; 159/DIG. 40; 202/160; 202/205; 203/1; 203/2; 203/10; 203/11; 203/27; 203/39

(58) Field of Classification Search .......... 159/24.1, 159/26.2, 44, DIG. 16, DIG. 40; 202/160, 202/176, 180, 182, 200, 205; 203/1, 2, 10, 203/11, 27, 39, 91, DIG. 18

See application file for complete search history.

(56) References Cited

U.S. PATENT DOCUMENTS

| 3,192,130 A | 6/1965 | Pottharst, Jr. |
| 3,423,294 A | 1/1969 | Sephton |
| 3,797,559 A * | 3/1974 | Paul et al. .......... 165/86 |

(Continued)

FOREIGN PATENT DOCUMENTS

CN    2597046 Y    1/2004

(Continued)

OTHER PUBLICATIONS

International Search Report and Written Opinion mailed Apr. 23, 2008 for International Application No. PCT/US07/84097, 12 pages.

(Continued)

*Primary Examiner* — Virginia Manoharan
(74) *Attorney, Agent, or Firm* — Cooley LLP

(57) ABSTRACT

In one embodiment, a method includes moving a first volume of fluid from a region above a heat-transfer element to a region below the heat-transfer element after the first volume of fluid is boiled from a second volume of fluid within the region above the heat-transfer element. The first volume of fluid including an impurity concentration lower than an impurity concentration of the second volume of fluid. The region below the heat-transfer element has a temperature higher than a temperature of the region above the heat-transfer element. The method also includes transferring latent heat from the first volume of fluid to a third volume of fluid on a top surface of the heat transfer element. The latent heat is released when the first volume of fluid condenses.

22 Claims, 11 Drawing Sheets

U.S. PATENT DOCUMENTS

| | | | |
|---|---|---|---|
| 3,956,072 | A | 5/1976 | Huse |
| 4,074,705 | A | 2/1978 | Robinson, Jr. et al. |
| 4,350,570 | A | 9/1982 | Maisotsenko et al. |
| 4,440,601 | A | 4/1984 | Katz et al. |
| 4,555,307 | A | 11/1985 | Hagen |
| 4,770,748 | A | 9/1988 | Cellini et al. |
| 4,891,140 | A | 1/1990 | Burke, Jr. |
| 5,232,556 | A | 8/1993 | Passarelli |
| 5,409,576 | A * | 4/1995 | Tleimat ............ 202/174 |
| 5,587,054 | A | 12/1996 | Keith |
| 5,622,605 | A | 4/1997 | Simpson et al. |
| 6,051,111 | A | 4/2000 | Prestidge |
| 6,254,734 | B1 | 7/2001 | Sephton |
| 6,436,242 | B1 | 8/2002 | Sanchez Belmar |
| 6,695,951 | B1 * | 2/2004 | Bitterly et al. ............ 202/182 |
| 6,740,205 | B2 | 5/2004 | Molintas |
| 6,804,962 | B1 | 10/2004 | Prueitt |
| 2001/0002989 | A1 | 6/2001 | Wagner |
| 2003/0146158 | A1 | 8/2003 | Mayer et al. |
| 2004/0055866 | A1 | 3/2004 | Levine |
| 2004/0159536 | A1 | 8/2004 | Kamen et al. |
| 2005/0011743 | A1 | 1/2005 | Hernandez et al. |
| 2005/0016828 | A1 * | 1/2005 | Bednarek et al. ............ 203/1 |
| 2005/0045466 | A1 | 3/2005 | Bitterly et al. |
| 2005/0163635 | A1 | 7/2005 | Berwanger et al. |
| 2007/0012556 | A1 * | 1/2007 | Lum et al. ............ 203/10 |

FOREIGN PATENT DOCUMENTS

| | | |
|---|---|---|
| JP | 60-153986 | 8/1985 |
| JP | 07-000703 | 1/1995 |
| WO | WO 2004/026767 A2 | 4/2004 |

OTHER PUBLICATIONS

Examination Report for Singapore Patent Application No. 200903171-7, mailed Aug. 4, 2010.

Office Action for U.S. Appl. No. 11/936,740, mailed Apr. 29, 2011.

Office Action for Chinese Patent Application No. 200780048915.8, mailed May 31, 2011.

Office Action for Japanese Patent Application No. 2009-536482, mailed Jun. 6, 2011.

Narmine H. Aly et al. "Mechanical vapor compression desalination systems—a case study" Desalination 158, Jan. 2003, pp. 143-150.

HF Pure Water "Vacuum Distillation Systems" [brochure], available before the filing date of Nov. 7, 2007, 6 pages.

"General Electric's water source" c/net News.com, Feb. 9, 2007, 19 pages.

EET Corp., "What is HEEPM™?" [online], [retrieved on Mar. 23, 2007], Retrieved from the Internet: <URL: http://www.eetcorp.com/heepm/heepm.htm> 1 page.

"Encyclopedia of Desalination and Water Resources: Home Page" [online], [retrieved on Mar. 23, 2007], Retrieved from the Internet: <URL: http://www.desware.net> 3 pages.

"Shoaiba Desalination Plant, Saudi Arabia" [online], [retrieved on Mar. 23, 2007], Retrieved from the Internet: <URL: http://www.water-technology.net/project_printable.asp?ProjectID=2159> 3 pages.

"Hydrologic Cycle" [online], [retrieved on Mar. 23, 2007], Retrieved from the Internet: <URL: http://www.und.nodak.edu/instruct/eng/fkarner/pages/cycle.htm> 3 pages.

"H2O: The Next Big Commodity" SFO Stocks, Futures and Opinions Magazine, [online], [retrieved on Jun. 4, 2007], Retrieved from the Internet: <URL: http://www.sfomag.com/homefeaturedetail.asp?ID=902316306&MonthNameID=June&Y> 8 pages.

S. Al-Kharabsheh et al. "Analysis of an innovative water desalination system using low-grade solar heat" Desalination 156, Feb. 2003, pp. 323-332.

Paul Rogers, "Is Desalination Drought Answer? Despite High Cost, Ocean Unlimited Source of Water" San Jose Mercury News, Jun. 3, 2007, 6 pages.

European Search Report for European Patent Application No. 07864121.4, mailed Feb. 28, 2012.

* cited by examiner

|   | Lb. Sq. In. p | Temp. Fahr. t | Specific Volume | | Enthalpy | | | Entropy | | | Internal Energy | | | Lb. Sq. In. p |
|---|---|---|---|---|---|---|---|---|---|---|---|---|---|---|
|   |   |   | Sat. Liquid $v_f$ | Sat. Vapor $v_g$ | Sat. Liquid $h_f$ | Evap. $h_{fg}$ | Sat. Vapor $h_g$ | Sat. Liquid $s_f$ | Evap. $s_{fg}$ | Sat. Vapor $s_g$ | Sat. Liquid $u_f$ | Evap. $u_{fg}$ | Sat. Vapor $u_g$ |   |
|   | 0.30 | 64.47 | 0.01605 | 1039.5 | 32.52 | 1057.4 | 1090.0 | 0.0641 | 2.0171 | 2.0812 | 32.52 | 999.8 | 1032.3 | 0.30 |
|   | 0.35 | 68.93 | 0.01605 | 898.5 | 35.97 | 1054.9 | 1091.9 | 0.0725 | 1.9953 | 2.0678 | 36.97 | 996.7 | 1033.7 | 0.35 |
|   | 0.40 | 72.85 | 0.01606 | 791.9 | 40.89 | 1052.7 | 1093.6 | 0.0799 | 1.9764 | 2.0563 | 40.89 | 994.1 | 1035.0 | 0.40 |
| 306 | 0.45 | 76.38 | 0.01607 | 708.5 | 44.41 | 1050.7 | 1095.1 | 0.0865 | 1.9597 | 2.0462 | 44.41 | 991.7 | 1036.1 | 0.45 |
|   | 0.50 | 79.58 | 0.01606 | 641.4 | 47.60 | 1048.8 | 1096.4 | 0.0924 | 1.9448 | 2.0372 | 47.60 | 989.5 | 1037.1 | 0.50 |
|   | 0.60 | 85.21 | 0.01609 | 540.0 | 53.21 | 1045.7 | 1098.9 | 0.1028 | 1.9188 | 2.0216 | 53.21 | 985.7 | 1038.9 | 0.60 |
| 308 | 0.70 | 90.08 | 0.01610 | 466.9 | 58.07 | 1042.9 | 1101.0 | 0.1117 | 1.8968 | 2.0085 | 58.07 | 982.4 | 1040.5 | 0.70 |
|   | 0.80 | 94.33 | 0.01612 | 411.7 | 62.36 | 1040.4 | 1102.8 | 0.1194 | 1.8777 | 1.9971 | 62.36 | 979.5 | 1041.9 | 0.80 |
|   | 0.90 | 98.24 | 0.01613 | 368.4 | 66.21 | 1038.3 | 1104.5 | 0.1263 | 1.8608 | 1.9871 | 66.21 | 976.9 | 1043.1 | 0.90 |
|   | 1.0 | 101.74 | 0.01614 | 333.6 | 69.70 | 1036.3 | 1106.0 | 0.1326 | 1.8456 | 1.9782 | 69.70 | 974.6 | 1044.3 | 1.0 |
|   | 1.2 | 107.92 | 0.01616 | 280.9 | 75.87 | 1032.7 | 1108.6 | 0.1435 | 1.8193 | 1.9628 | 75.87 | 970.3 | 1046.2 | 1.2 |
|   | 1.4 | 113.26 | 0.01618 | 243.0 | 81.20 | 1029.6 | 1110.8 | 0.1528 | 1.7971 | 1.9498 | 81.20 | 966.7 | 1047.9 | 1.4 |
|   | 1.6 | 117.99 | 0.01620 | 214.3 | 85.91 | 1026.9 | 1112.8 | 0.1610 | 1.7776 | 1.9386 | 85.91 | 963.5 | 1049.4 | 1.6 |
|   | 1.8 | 122.23 | 0.01621 | 191.8 | 90.14 | 1024.5 | 1114.5 | 0.1683 | 1.7605 | 1.9288 | 90.13 | 960.6 | 1050.7 | 1.8 |

METHODS AND APPARATUS FOR DISTILLATION USING PHASE CHANGE ENERGY

CROSS-REFERENCE TO RELATED APPLICATIONS

This application claims priority to U.S. Provisional Application Ser. No. 60/864,899, entitled, "Liquid Purification System," filed on Nov. 8, 2006, which is incorporated herein by reference in its entirety. This application is related to the following commonly owned and assigned applications: U.S. Patent Publication No. 2008/0105529, entitled "Methods and Apparatus for Distillation of Shallow Depth Fluids" filed on Nov. 7, 2007 and U.S. Patent Publication No. 2008/0105531, entitled "Methods and Apparatus for Signal Processing associated with Phase Change Distillation" filed on Nov. 7, 2007, both of which are incorporated herein by reference in their entireties.

BACKGROUND

Embodiments of the invention relate generally to distillation, and in particular, to methods and apparatus for efficient distillation over a wide range of temperatures and pressures.

A number of known devices and methods have been utilized to distill (or separate) a fluid from a mixture of fluids. For example, known desalinators can be used to purify seawater to produce fresh water of a lower salinity for irrigation or drinking purposes. Known distillation devices and methods, however, are often complex, operate at high pressures and/or temperatures, and require large quantities of power due to inefficiencies. Thus, a need exists for a distillation apparatus and methods that can enable efficient operation over a wide range of temperatures and/or pressures.

SUMMARY OF THE INVENTION

In one embodiment, a method includes moving a first volume of fluid from a region above a heat-transfer element to a region below the heat-transfer element after the first volume of fluid is boiled from a second volume of fluid within the region above the heat-transfer element. The first volume of fluid including an impurity concentration lower than an impurity concentration of the second volume of fluid. The region below the heat-transfer element has a temperature higher than a temperature of the region above the heat-transfer element. The method also includes transferring latent heat from the first volume of fluid to a third volume of fluid on a top surface of the heat transfer element. The latent heat is released when the first volume of fluid condenses.

DETAILED DESCRIPTION

Figure 1:
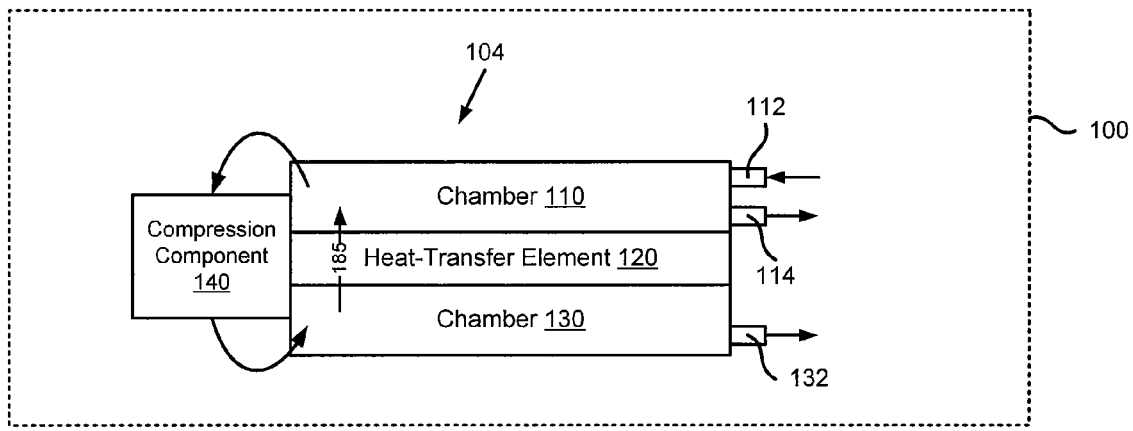
FIG. 1 is a schematic block diagram that illustrates a distillation system, according to an embodiment of the invention.

FIG. 1 is a schematic block diagram that illustrates a distillation system 100, according to an embodiment of the invention. In some embodiments, the distillation system can also be referred to as a distillation unit. The distillation system 100 is configured to re-use energy to efficiently separate a substance from a mixture of two or more substances. Specifically, energy that is released and/or added to the system during the separation process is utilized continuously to promote further separation in a cyclical fashion. In some embodiments, the distillation system can be a high efficiency distillation system that can have different portions that operate at different temperatures (e.g., at low temperature or at high temperature) and/or different pressures (e.g., at low pressure or at high pressure).

The distillation system 100 includes a heat-transfer element 120, a compression component 140, and two chambers-chamber 110 and chamber 130. The components of the distillation system 100 are configured to operate in a coordinated fashion to separate a substance from a mixture of two or more substances through phase changes of the substance as portions of the mixture are cycled through the distillation system 100. For example, the substance can be separated from the mixture through a first phase change within chamber 110. The first phase change can be induced (e.g., caused) by energy that is released from a second phase change within chamber 130 and that is transferred from chamber 130 to chamber 110 via the heat-transfer element 120. Energy can be added to at least some portions of the mixture by the compression component 140 as the portions cycle through the distillation system 100.

In some embodiments, the first phase change can be opposite that of the second phase change. For example, the first phase change can be a phase change from a liquid state to a gaseous state and the second phase change can be a phase change from a gaseous state to a liquid state, and vice versa. Thus, the first phase change can be an endothermic (e.g., require/consume energy) phase transition requiring, for example, a latent heat of vaporization while the second phase change can be an exothermic (e.g., release energy) phase transition releasing, for example, a latent heat of condensation.

The distillation system 100 can be configured to operate over a wide range of temperatures and pressures. For example, each of the chambers 110 and 130 of the distillation system 100 can be configured to operate at a temperature and/or a pressure substantially below that of a normal boiling point of a substance within a mixture. In some embodiments, the chambers 110 and 130 of the distillation system 100 can be configured to operate at or above a temperature and/or a pressure associated with a normal boiling point of a substance within a mixture. In some embodiments, chamber 110 and chamber 130 can be configured to operate at temperatures and/or pressures that are separated by a specified interval.

As shown in FIG. 1, chamber 110 can be configured to receive via inlet 112 a volume of a mixture that is a fluid and that has a concentration of an impurity. The impurity can be, for example, one or more elements, compounds, substances, or materials included in (e.g., ionized in, suspended in) the volume of fluid in any phase (e.g., solid, liquid, gas). A portion of fluid can be boiled into a gaseous phase from the volume of fluid within chamber 110, and moved into the compression component 140. The gaseous portion of fluid can be compressed by the compression component 140 and moved into chamber 130 where the gaseous portion of fluid can release heat 185 as the gaseous portion of fluid condenses against the heat-transfer element 120. The heat 185 released from the condensing portion of fluid can be used to further induce boiling in a volume of fluid subsequently introduced into chamber 110 via inlet 112 (e.g., after the gaseous portion of fluid is boiled within chamber 110).

The portion of fluid boiled from the volume of fluid can be referred to as a distillate and can have a relatively low concentration of the impurity relative to the volume of fluid. In other words, the portion of fluid boiled from the volume of fluid can be a substantially purified fluid with a relatively low level of the impurity compared with the original mixture. In some embodiments, the impurity concentration of the original volume of fluid will be increased because the portion of fluid is boiled from the volume of fluid and has a relatively low concentration of the impurity. In some embodiments, the purified fluid can be a desired product (e.g., target product) from the distillation system 100. The volume of fluid with the higher impurity concentration can be referred to as a by-product and can be removed from chamber 110 via outlet 114. In some embodiments, the by-product can also be a desirable distillate or a target distillate.

Once the distillation system 100 attains a steady-state operating condition, continuous heat transfer through a cycle of a phase change in chamber 110, and an opposite phase change chamber 130, can be used to produce large volumes of a distillate efficiently because the energy needed for the phase change to obtain the distillate from a volume of fluid is substantially provided by the opposite phase change. Energy needed to operate in a continuous mode can substantially be equal to the energy necessary to operate the compression component 140. In some embodiments, the distillation system 100 can include a control system (not shown) configured to process signals associated with, for example, the flow of one or more fluids and/or heat transfer within the distillation system 100. More details related to a control system within a distillation system 100 will be discussed in connection with FIGS. 11 and 12.

Although the distillation system 100 shown in FIG. 1 can be used to separate a variety of substances from a variety of mixtures (e.g., methanol from a methanol-water mixture, gasoline from gasoline-water mixture, water from a sap-water mixture) in a variety of applications (e.g., waste water treatment), the following disclosure in connection with embodiments of the invention will focus on separation/distillation of water from a salt-water compound ($NaCl$—$H_2O$) in a liquid state as a representative example. In some embodiments, the salt can be dissolved in the water in, for example, an ionized state.

Figure 2:
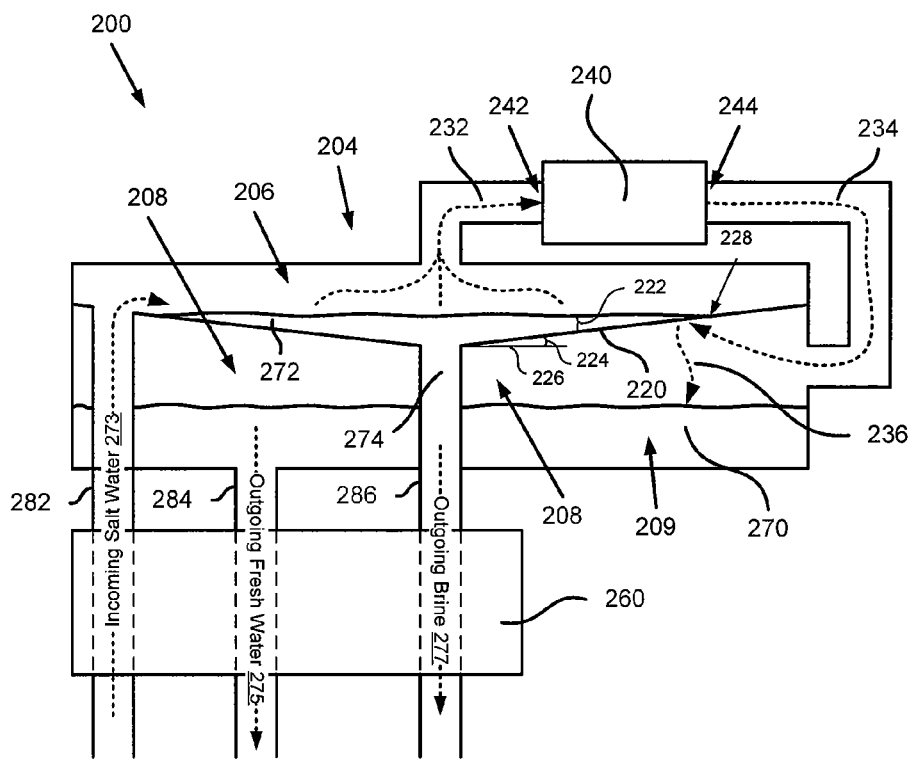
FIG. 2 is a schematic illustration of a distillation system configured to separate water from salt-water, according to an embodiment of the invention.

FIG. 2 is a schematic illustration of a distillation system 200 configured to separate water from salt-water, according to an embodiment of the invention. In some embodiments, the salt-water can have other impurities included in (e.g., dissolved in, suspended in) the salt-water such as calcium-based compounds (e.g., calcium chloride ($CaCl$)), zirconium-based compounds, and/or magnesium-based compounds. Many of the phantom lines such as phantom line 232 represent movement of a fluid associated with the distillation system 200.

As shown in FIG. 2, the distillation system 200 has a housing 204 that has a boiler portion 206 and a condenser portion 208. An incoming salt-water stream 273 can be moved by, for example, a pump (not shown) into a volume of salt-water 272 in the boiler portion 206 of the housing 204 via an inlet 282. When the volume of salt-water 272 is above a heat-transfer element 220 in the boiler portion 206, heat is transferred to the salt-water 272 via the heat-transfer element 220 so that fresh steam can be boiled from the salt-water 272 and can be moved 232 into a compression component 240. The fresh steam can be drawn into (e.g., pulled into) the compression component 240 by the compression component 240.

The fresh steam is compressed by the compression component 240 so that a temperature and/or a pressure of the fresh steam at the outlet 244 of the compression component 240 is higher than the temperature and/or the pressure of the fresh steam at the inlet 242 of the compression component 240. The mechanical energy of the compression component 240 increases the temperature and/or the pressure of the fresh steam as it is moved through the compression component 240. In some embodiments, the volume of fresh steam is reduced by as much as half when the fresh steam is compressed by the compression component 240.

The compressed fresh steam is moved 234 into the condenser portion 208 of the housing 204 and contacts a bottom surface of the heat-transfer element 220 so that the compressed fresh steam can condense and fall 236 into a volume of fresh water 270 in a fresh water collection portion 209 of the housing 204. The fresh water collection portion 209 can also be referred to as a fresh water reservoir, fresh water container, or fresh water tank. The fresh water 270 can be removed from the housing 204 in an outgoing fresh water 275 stream via an outlet 284 by, for example, a pump (not shown).

As the fresh steam is boiled from the salt-water 272, a concentration of salt in the salt-water 272 is increased until the salt-water 272 becomes brine 274. In some embodiments, the brine 274 can be water saturated or nearly saturated with salt. The brine 274 can be removed from the housing as an outgoing brine stream 277 via an outlet 286 by, for example, a pump (not shown). In some embodiments, the outgoing brine stream 277 can be removed by gravity. In some embodiments, the brine 274 can be, for example, approximately 25% salt by weight. In some embodiments, the brine 274 can be sold as a product used for medicinal purposes, culinary purposes, in an oil extraction process (not shown), in a heat exchange process (not shown), and/or as a reactant in chemical process (not shown).

Although the water boiled from the salt-water 272 and the water condensed at the heat-transfer element 220 are referred to as fresh steam and fresh water, respectively, the fresh steam and fresh water can include some impurities. However, the concentration of impurities (e.g., concentration based on moles, concentration based on weight) can be significantly lower than that in the salt-water 272. In other words, the salinity of the fresh water can be lower than that of the salt-water 272. Said differently, the fresh steam and/or the fresh water can have a salt concentration lower than a salt concentration of the salt-water 272 before the fresh steam is boiled from the salt-water 272.

The fresh steam can be boiled from the salt-water 272 above the heat-transfer element 220 using almost exclusively a latent heat released from condensation of the compressed steam from the compression component 240. In other words, the energy/heat needed for the endothermic phase transition of the liquid water in the salt-water 272 into the fresh steam can be substantially provided by the energy/heat from the exothermic phase transition of the gaseous compressed steam into liquid water (e.g., condensed fresh water 270). In some embodiments, the flow-rate of fluids (e.g., salt-water, steam, etc.) to, from, and/or within the housing 204 can be defined so that fresh steam is boiled nearly entirely by heat from condensation of the compressed steam from the compression component 240 (shown as line 234).

As shown in FIG. 2, the heat-transfer element 220 has a sloped surface with respect to a horizontal plane 226. In some embodiments, an angle 224 of the heat-transfer element 220 with respect to the horizontal plane 226 can be a few degrees (e.g., 1 degree, 15 degrees, 45 degrees) or even a fraction of a degree. The slope of the heat-transfer element 220 is designed to facilitate boiling of the fresh steam from the salt-water 272 by enabling heat transfer through the heat-transfer element 220 to a shallow depth 222 of the salt-water 272. In this embodiment, a surface of the salt-water 272 intersects the heat-transfer element 220 at a zero-depth point 228. In some embodiments, the depth 222 of the salt-water 272 can be between a fraction of an inch (e.g., 0.1 inches) and several inches (e.g., 2.2 inches, 5 inches).

A higher percentage of heat transferred via the heat-transfer element 220 can be directly used to cause boiling because the depth 222 of the salt-water 272 over all or a portion of the heat-transfer element 220 is shallow. In other words, the shallow depth 222 promotes efficient heat transfer. Specifically, the effects of the heat will not be offset significantly by conduction to new, cooler incoming salt-water 273 as it flows via inlet 282 into the volume of salt-water 272 in the boiler portion 206 of the housing 204. Also, boiling within the boiler portion 206 of the housing 204 will not be significantly inhibited by static pressure related to the depth 222 of the salt-water 272 when the depth 222 of the salt-water 272 is shallow.

The heat-transfer element 220 can be constructed of a material that facilitates efficient heat transfer from the condenser portion 208 to the boiler portion 206 of the housing 204. Specifically, the material of the heat-transfer element 220 can be chosen so that the thermal conductivity of the heat-transfer element 220 is relatively high and will not result in undesirable, inefficient heat loss. For example, the heat-transfer element 220 can be constructed of a pure metal and/or an alloy that can include substances such as copper, silver, gold, and/or aluminum. Also, the heat-transfer element 220 can be relatively thin so that the heat-transfer element 220 will further promote efficient heat transfer at a desirable level. In some embodiments, for example, the heat-transfer element can be a fraction of an inch (e.g., ⅛ of an inch, 1/32 of an inch). In some embodiments, the heat-transfer element 220 can be or can include a polymer-based material.

In this embodiment, the heat-transfer element 220 is entirely disposed within the housing 204 and defines at least a portion of the boiler portion 206 and at least a portion of the condenser portion 208 of the distillation system 200. For example, the top surface of the heat-transfer element 220 defines a bottom boundary of the boiler portion 206, and the bottom surface of the heat-transfer element 220 defines a top boundary of the condenser portion 208.

In some embodiments, the shape of the heat-transfer element 220 can be modified so that compressed fresh steam impinging on the bottom surface of the heat-transfer element 220 will be channeled to certain locations on the heat-transfer element 220. In some embodiments, the heat transfer-element 220 can have different (e.g., varying) thicknesses and/or shapes over at different portions of the heat-transfer element 220 so that the different portions will have different heat-transfer characteristics. The heat-transfer characteristics can vary according to temperature and/or pressure gradients within the boiler portion 206 and/or the condenser portion 208. Various shapes and types of heat transfer-elements are discussed in connection with subsequent figures.

In some embodiments, the distillation system 200 can have a distribution component (not shown) to facilitate distribution of compressed steam from the compression component 240 (shown as line 234) against the bottom surface of the heat-transfer element 220. For example, the distribution component can be configured to cause the compressed steam to be substantially evenly distributed along the bottom surface of the heat-transfer element 220 or distributed in a particular pattern against the heat-transfer element 220. In some embodiments, the distribution component can be configured to distribute the compressed steam against the bottom surface of the heat-transfer element 220 based on and/or to create a specified pressure gradient and/or temperature gradient within the boiler portion 206 and/or the condenser portion 208.

In some embodiments, the distribution component can be configured to force the compressed steam to impinge on the bottom surface of the heat-transfer element 220 to facilitate condensation. For example, the compressed steam can be forced onto the bottom surface of the heat-transfer element 220 to move substances off of the bottom surface heat-transfer element 220 that may inhibit condensation (e.g., precipitates, condensed fresh water). More details related to a distribution component are discussed in connection with FIGS. 6A and 6D.

The components of the distillation system 200 can be constructed of various materials such as, for example, metals, rubbers, and/or polymer-based materials (e.g., acrylic, polyethylene, fiberglass). For example, the housing 204 of the distillation system 200 can be constructed of a plastic material such as Teflon or polystyrene, and the piping of the distillation system 200 can be a poly-vinyl chloride (PVC)-based material.

As shown in FIG. 2, the outgoing brine stream 277 from outlet 286, the outgoing fresh water stream 275, and the incoming salt-water stream 273 are configured to exchange heat in a heat-exchanger 260. The heat-exchanger 260 is configured to exchange heat from the outgoing brine stream 277 and the outgoing fresh water stream 275 with the incoming salt-water stream 273 to preheat the incoming salt-water stream 273. By transferring heat to the incoming salt-water stream 273 before it enters the boiler portion 206, the temperature of the incoming salt-water stream 273 can be at or substantially close to the boiling point of water at the operating pressure of the boiler portion 206 of the distillation system 200. Thus, only a relatively small quantity of heat will be required to cause the salt-water 272 to boil (e.g., a latent heat of condensation). The small quantity of heat can be added by the compression component 240 to the compressed steam, which eventually releases the heat to the salt-water 272 to cause it to boil when the compressed steam condenses at the heat-transfer element 220. It logically follows that the energy used by the compression component 240 can be reduced when the incoming salt-water stream 273 (which feeds into the salt-water 272) is closer to a desired boiling point (e.g., a desirable temperature and/or pressure for boiling).

In some embodiments, the heat exchanger 260 can be configured to use energy from outside of the distillation system 200 to preheat the incoming salt-water stream 273. For example, the heat exchanger 260 can be configured to use solar energy (not shown) or energy from an output (e.g., a waste stream, a low-grade waste heat) from a separate process (not shown) to preheat the incoming salt-water stream 273 to a desired temperature at a specified operating pressure of the boiler portion 206 of the housing 204. In some embodiments, the heat exchanger 260 can be, for example, a shell and tube heat exchanger, a plate heat exchanger, and/or a regenerative heat exchanger.

In some embodiments, one or more of the components of the distillation system 200, in addition to, or instead of the heat exchanger 260, can be configured to use energy scavenged from an environment surrounding the distillation system 200. For example, one or more pumps (not shown), control units (not shown), and/or sensors (not shown) associated with the operation of the distillation system 200 can be powered by wind energy, solar energy, and/or energy from an output (e.g., waste stream) from a separate process (not shown). One or more of the components of the distillation system 200 can be powered by an energy storage device such as a battery and/or a fuel cell.

The distillation system 200 can be configured to produce fresh water from salt-water 272 over a wide range of temperatures and pressures. In this embodiment, one or more portions of the distillation system 200 (e.g., the boiler portion 206, the condenser portion 208) can be configured to operate at a temperature and/or a pressure substantially below that associated with a normal boiling point of water. For example, the boiler portion 206 can be configured to operate at a specified pressure substantially below a standard atmospheric pressure (e.g., 1 atmosphere). In some embodiments, one or more portions of the distillation system 200 (e.g., the boiler portion 206, the condenser portion 208) can be configured to operate at a temperature and/or a pressure at or above that associated with a normal boiling point of water.

The distillation system 200 can be configured so that the boiler portion 206 and the condenser portion 208 operate at a temperature separated by a specified interval and/or operate at a pressure separated by a specified interval. For example, the boiler portion 206 and the condenser portion 208 can be configured to operate at temperatures separated by a few degrees (e.g., a few degrees Fahrenheit (F), a few degrees Kelvin (K)). In some embodiments, the boiler portion 206 and the condenser portion 208 can be configured to operate at pressures separated by a fraction of a pressure unit (e.g., a pounds per square inch absolute (psia) unit, a millimeters of mercury (mmHg) unit). The energy resulting in the difference in pressure and/or the difference in temperature between the boiler portion 206 and the condenser portion 208 can be provided by mechanical energy from the compression component 240.

Figures 3, 4:
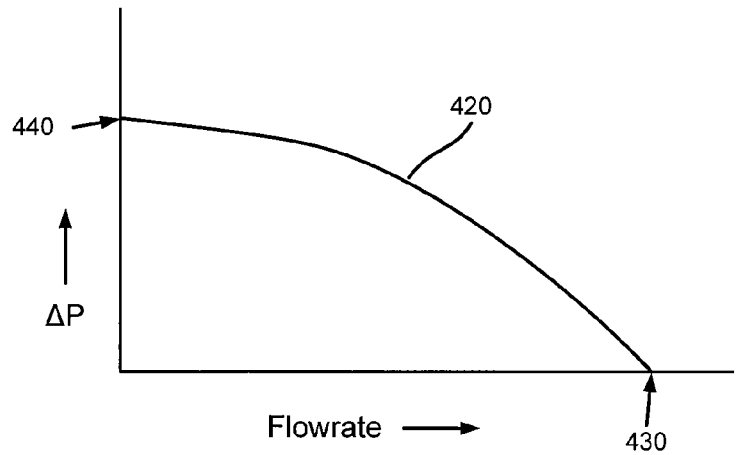
FIG. 3 illustrates a steam saturation table that can be used to determine an operating point of at least portion of a distillation system, according to an embodiment of the invention.
FIG. 4 is a schematic diagram that illustrates a characterization curve associated with a compression component, according to an embodiment of the invention.

FIG. 3 illustrates a steam saturation table that can be used to determine an operating point of at least a portion of a distillation system, according to an embodiment of the invention. The operating point can be defined by a combination of, for example, an operating pressure, an operating temperature, an operating humidity, and so forth. The distillation system can be, for example, distillation system 200 shown in FIG. 2. The respective operating points of the boiler portion 206 and the condenser portion 208 can be selected by: (1) selecting the boiler portion 206 operating point using the saturation table shown in FIG. 3, and (2) calculating the condenser portion 208 operating point based on the boiler portion 206 operating point. The operating point of the condenser portion 208 can be calculated from the boiler portion 206 operating point based on several factors, including, for example, the heat transfer characteristics of the heat-transfer element 220 and heat of vaporization changes due to impurities.

For example, at an operating point of 0.5 psia and 78° F. (shown at 306), 1096.4 British Thermal Units (BTUs) are required to cause a phase change of a pound (lb) of liquid water at the boiler portion 206. If the heat-transfer efficiency at the heat-transfer element 220 is 99.91% and impurities within the salt-water 272 increase the heat of vaporization by 0.14%, the heat required at the condenser side of the heat-transfer element 220 to cause vaporization is 1098.9 BTU/lb. Based on the saturation table, the operating point at the condenser portion 208 should be 0.6 psia and 85° F. (shown at 308) to meet this heat requirement. The condenser portion 206 is operated at a slightly higher steady-state temperature and pressure so that heat from condensation in the condenser portion 208 will be transferred to the boiler portion 206 via the heat-transfer element 220. In some embodiments, a reduction in a thickness of the heat-transfer element 220 can increase the efficiency of the heat-transfer element 220.

Referring back to FIG. 2, in some embodiments, a difference in temperature and/or pressure of the operating points of the boiler portion 206 and the condenser portion 208 can substantially be produced by the compression component 240. In other words, energy can be added to fluids (e.g., fresh steam) moving from the boiler portion 206 to the condenser portion 208 to maintain the different conditions of the operating points. In some embodiments, the boiler portion 206 of the distillation system 200 can operate at high temperature and/or pressure and the condenser portion 208 of the distillation system 200 can operate at low temperature and/or pressure, and vice versa.

If the boiler portion 206 is configured to operate at a low pressure that is substantially below a standard atmospheric pressure, the low pressure can be maintained/generated by the weight of the incoming salt-water 273 stream. Although not shown in FIG. 2, the distillation system 200 can be configured so that the incoming salt-water 273 is a column of incoming salt-water with a weight that is suspended below the boiler portion 206 by the pressure in the boiler portion 206. Moreover, the height of the column of the incoming salt-water 273 stream can be defined to create a specified low pressure within the boiler portion 206. Other streams of the distillation unit 200 such as the outgoing brine 277 stream can be similarly configured to assist in maintaining/defining a low pressure within the boiler portion 206. The weight of the outgoing fresh water 275 can be used to maintain/define a specified pressure in the condenser portion 208.

In some embodiments, the distillation system 200 can be operated at a specified temperature and/or pressure to substantially prevent a particular undesirable side-effect. In some embodiments, the distillation system 200 can be configured operate at a specified temperature and/or at a specified pressure to prevent precipitation and/or dissolution of different compounds (e.g., magnesium-based compounds). For example, the distillation system 200 can be configured to operate at a temperature below 185° F. so that impurities such as calcium-based compounds that may be in the salt-water 272 will not precipitate. In some embodiments, the boiler portion 206, for example, can be configured to operate above a specified temperature so that particular impurities (e.g., microbes, bacteria) will be destroyed. Also, insulation of the distillation system 200 from, for example, an ambient environment can be reduced by operating at a lower temperature than if the distillation system 200 were operating at a high temperature.

In some embodiments, condensation of fresh steam at the bottom surface of the heat-transfer element 220 can assist in maintaining the low pressure environment at, for example, a condenser portion 208 of the distillation system 200. In other words, the collapse of the voluminous compressed steam into a liquid when the compressed steam condenses can create a negative pressure environment that can decrease the pressure of the condenser portion 208 of the distillation system 200.

In some embodiments, as the outgoing brine stream 277 is pumped out of the boiler portion 206 of the housing 204, the pressure within the boiler portion 206 of the housing 204 can be decreased. In some embodiments, the flow-rate of the brine stream 277 can be adjusted to assist in maintaining a low pressure operating environment within the boiler portion 206 of the housing 204. In some embodiments, the distillation system 200 can continuously operate at a steady-state after a start-up sequence. In some embodiments, the energy required during steady-state is substantially the energy required to operate the compression component 240. More details related to a start-up sequence are discussed in connection with FIG. 13.

In some embodiments, the compression component 240 can have a monotonically changing pressure differential versus flow-rate characteristic such as that shown in FIG. 4. FIG. 4 is a schematic diagram that illustrates a characterization curve 420 associated with a compression component, according to an embodiment of the invention. As shown in FIG. 4, a pressure differential ($\Delta P$) (shown on the y-axis) of the compression component monotonically decreases as a flow-rate (shown in the x-axis) through the compression component increases. The pressure differential is a difference in pressure between an outlet of the compression component and an inlet of the compression component. The monotonically changing characteristic of the compression component promotes stability of a distillation system (e.g., distillation system 100 shown in FIG. 1) especially when the distillation system is operating at low temperatures and/or at low pressures.

In some scenarios, a compression component that does not have a monotonically changing pressure differential versus flow-rate characteristic could oscillate between flow-rates in an unstable fashion when a pressure in a housing of the distillation system were to, for example, unexpectedly drop. This type of oscillation could cause the distillation system to fail to produce a distillate or to produce an undesirable distillate because a continuous phase change energy would not be available due to the inconsistent flow.

In some embodiments, the compression component 240 can include one or more compressors (e.g., staged compressors) and/or one or more valving components (not shown). The compression component 240 can be, for example, a centrifugal compressor, a hydraulic compressor, a diagonal or mixed-flow compressor, an axial-flow compressor, a reciprocating compressor, a rotary screw compressor, a scroll compressor, a lobe type compressor (e.g., roots blower) and/or a diaphragm compressor. In some embodiments, the compression component 240 can include a system of coordinated valves such as that shown in and described in connection with FIG. 8.

In some embodiments, the compression component 240 can be disposed within the housing 204 of the distillation system 200. In some embodiments, by disposing the compression component 240 in the housing 204, issues associated with, for example, small leaks within the compression component 240 can be mitigated or completely avoided. For example, the compression component 240 can include a hydraulic motor disposed within the housing 204. In some embodiments, heat generated by mechanical portions of the compression component 240 can be transferred to the salt-water 272 to further induce boiling at the boiler portion 206 of the housing 204. In some embodiments, a motor disposed outside of the housing 204 can be magnetically coupled to a propeller(s) or fan blade(s) that is disposed within the housing 204 and that is configured to compress fresh steam.

In some embodiments, the compression component 240 can be disposed below the heat-transfer element 220 and/or the housing 204. In some embodiments, the distillation system 200 can have multiple compression components, multiple incoming streams of each type of incoming stream (e.g., multiple incoming salt-water streams), multiple outgoing streams of each type of outgoing stream (e.g., multiple outgoing brine streams), multiple boiler and/or condenser portions, and/or multiple heat-transfer elements. In some embodiments, the distillation system 200 can have multiple stages. For example, an outgoing stream from a first distillation system can be an incoming stream on a second distillation system.

In some embodiments, the distillation system 200 can have a degassing system (not shown) configured to degas, for example, the incoming salt-water stream 273 so that boiling above the heat-transfer element 220 will not be undesirably disrupted if a gas is released from the salt-water. In some embodiments, the degassing system can be configured to degas the incoming salt-water 273 before the salt-water is received at the heat exchanger 260. In some embodiments, the degassing system can be configured to degas the incoming salt-water 273 after the heat-exchanger 260. In some embodiments, at least a portion of the degassing system can be disposed within the housing 204.

In some embodiments, the distillation system 200 can include, for example, a sonic transducer (not shown) configured to facilitate boiling above the heat-transfer element 220. In some embodiments, the sonic transducer can be an ultrasonic transducer. The sonic transducer can enhance fracturing of the salt-water, for example, to facilitate a change from a liquid state to a vapor state. In some embodiments, the sonic transducer can be further used to degas the salt-water 272. In some embodiments, the ultrasonic transducer can be disposed within the boiler portion 206 of the housing 204.

Figure 5:
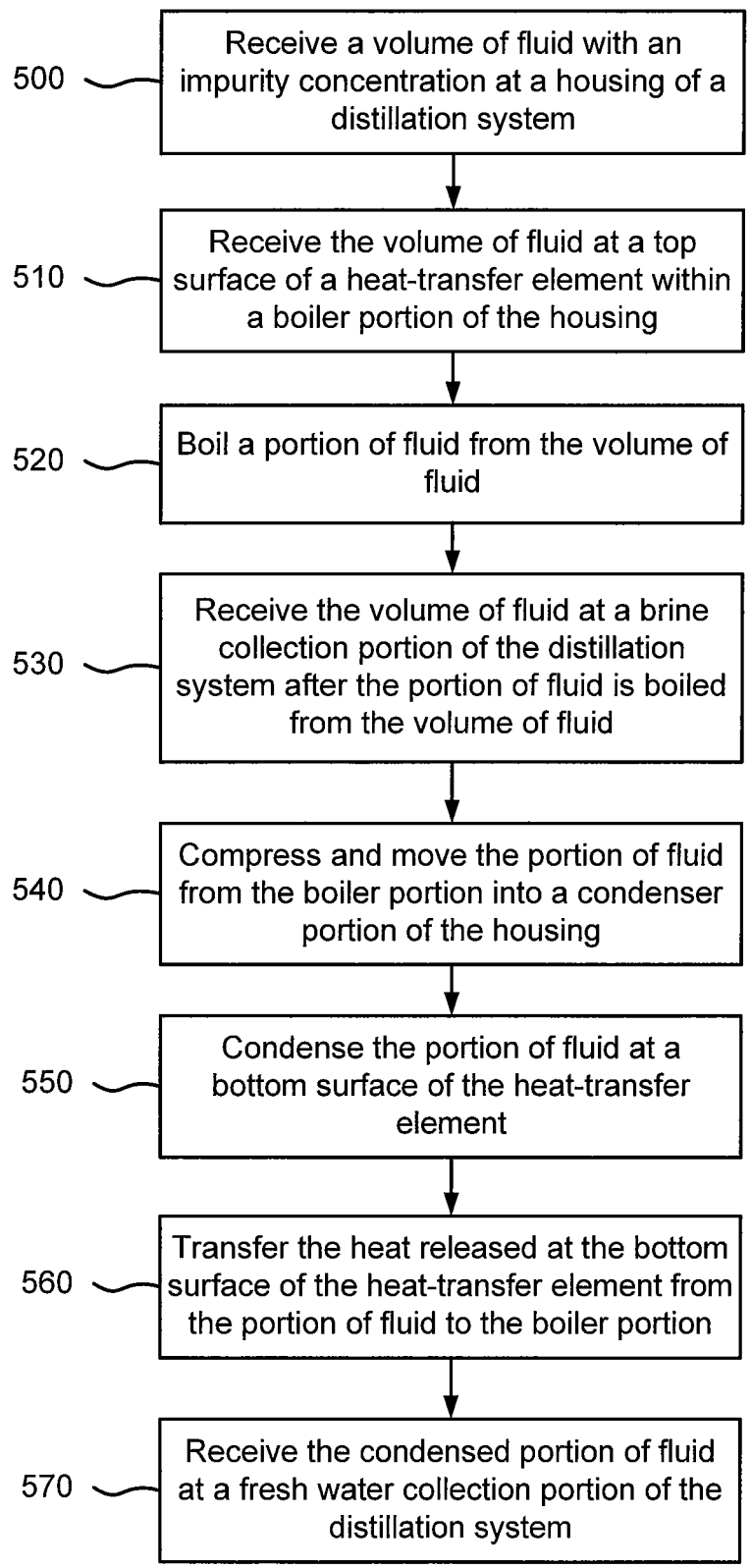
FIG. 5 is a flowchart that illustrates a method for separating a portion of fluid from a volume of fluid, according to an embodiment of the invention.

FIG. 5 is a flowchart that illustrates a method for separating a portion of fluid from a volume of fluid, according to an embodiment of the invention. The flowchart illustrates that a volume of fluid with an impurity concentration is received at a housing of a distillation system at 500. The volume of fluid can be a volume of water and the impurity concentration can be, for example, salt. In some embodiments, the volume of fluid can include multiples types of impurities (e.g., calcium-based impurities, magnesium-based impurities).

The volume of fluid is received at a top surface of a heat-transfer element within a boiler portion of the housing at 510. The volume of fluid can be pumped from, for example, a body of salt-water and received via an inlet of the housing. The top surface of the heat-transfer element can define at least a portion of the boiler portion of the housing.

A portion of fluid is boiled from the volume of fluid at 520. If the volume of fluid is a volume of salt-water, the portion of fluid can be fresh water boiled from the salt-water in a gaseous state as steam.

The volume of fluid is received at a brine collection portion of the distillation system at 530 after the portion of fluid is boiled from the volume of fluid. In some embodiments, the volume of fluid can have a different impurity concentration after the portion of fluid is boiled from the volume of fluid.

The portion of fluid is compressed and moved from the boiler portion into a condenser portion of the housing at 540. The portion of fluid can be compressed and moved by a compression component coupled to the housing.

The portion of fluid is condensed at a bottom surface of the heat-transfer element at 550. The portion of fluid can be condensed as the portion of fluid is impinged against the bottom surface of the heat-transfer element. The bottom surface of the heat-transfer element can define at least a portion of the condenser portion of the housing.

The heat released at the bottom surface of the heat-transfer element is transferred from the portion of fluid to the boiler portion at 560. In some embodiments, all or substantially all of the heat released at the bottom surface of the heat-transfer element can be transferred via the heat-transfer element.

The condensed portion of fluid is received at a fresh water collection portion of the distillation system at 570. In some embodiments, the condensed portion of fluid can be pumped from the fresh water collection portion of the distillation system. In some embodiments, the fresh water collection portion of the distillation system can be disposed within the housing.

Figure 6A:
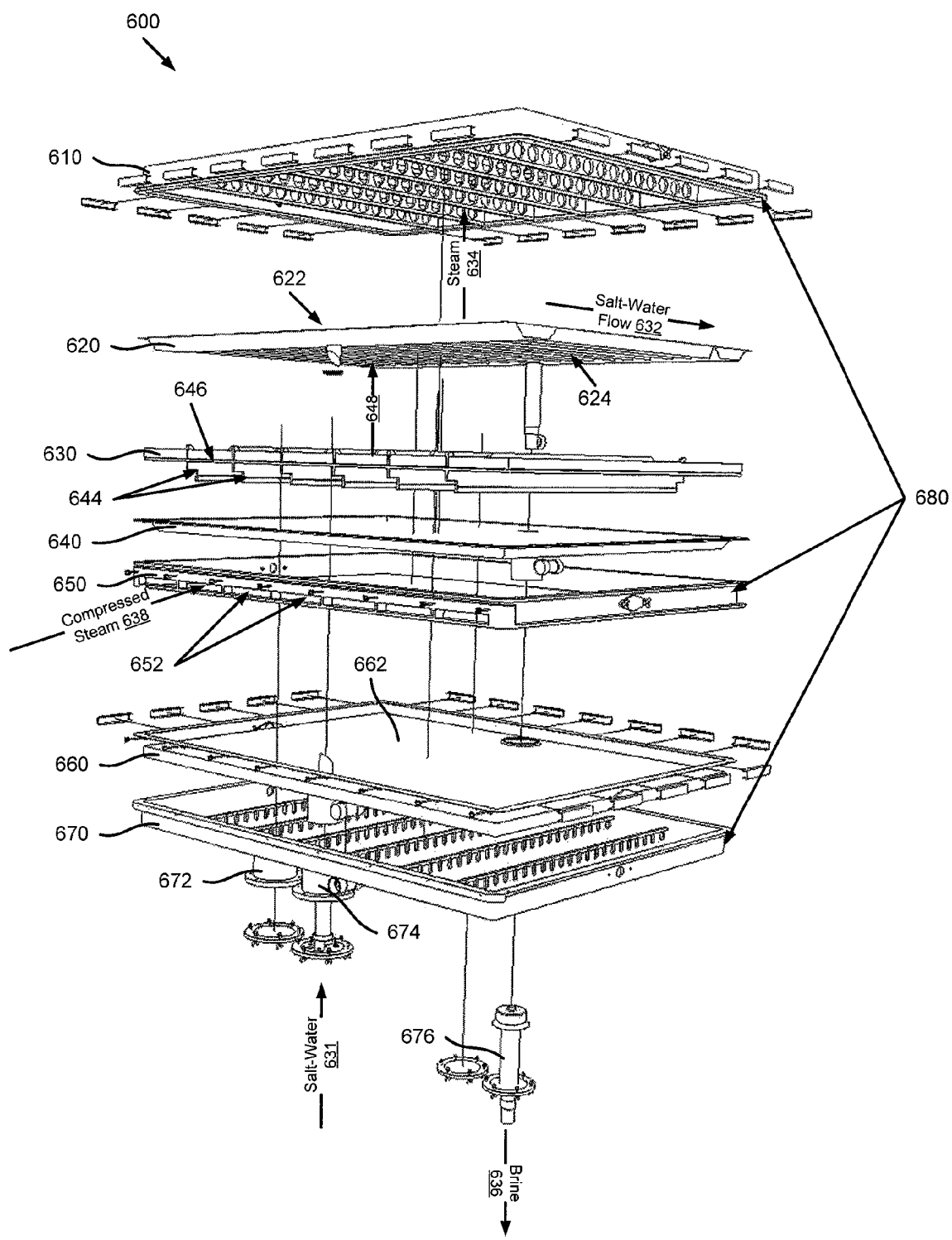
FIG. 6A is a exploded perspective view of several components of a distillation system, according to an embodiment of the invention.

FIG. 6A is a an exploded perspective view of several components of a distillation system 600, according to an embodiment of the invention. The distillation system 600 has a top portion 610 of a housing 680 that defines at least a portion of a boiler, a heat-transfer element 620, a distribution component 630, and a fresh water collection reservoir 640. In this embodiment, incoming salt-water 631 is received within the distillation system 600 via inlet 674. The salt-water flows along a top portion 622 of the heat-transfer element 620 in the direction of arrow 632 and fresh steam is boiled from the salt-water as shown by arrow 634. In some embodiments, a slope of the heat-transfer element 620 is substantially less then 1 degree with respect to a horizontal plane.

Figure 6B:
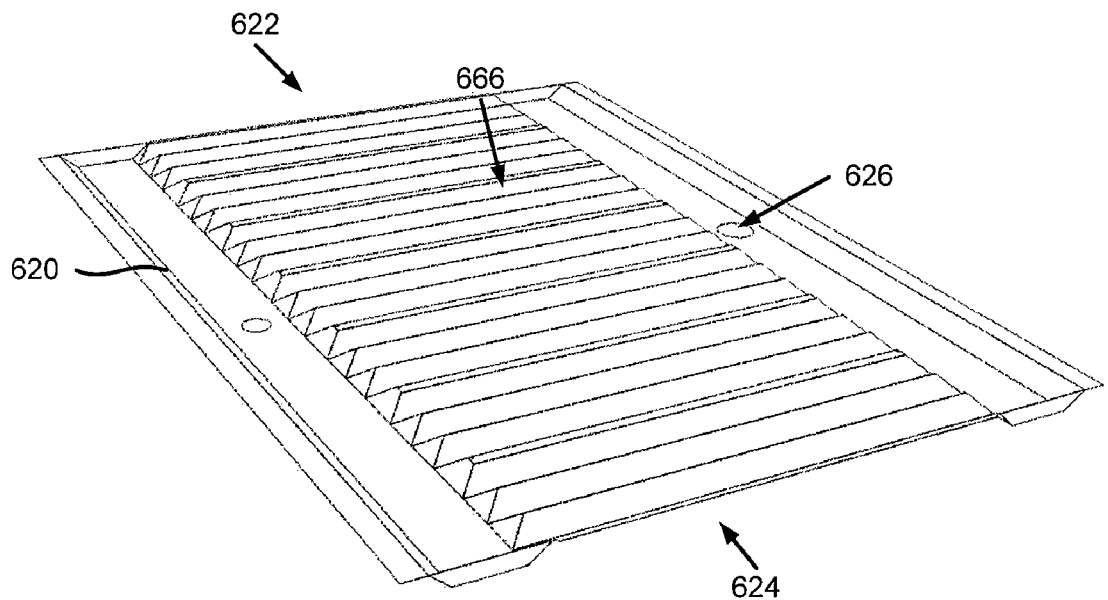
FIG. 6B is a perspective view of a heat-transfer element of FIG. 6A without salt-water, according to an embodiment of the invention.
Figure 6C:
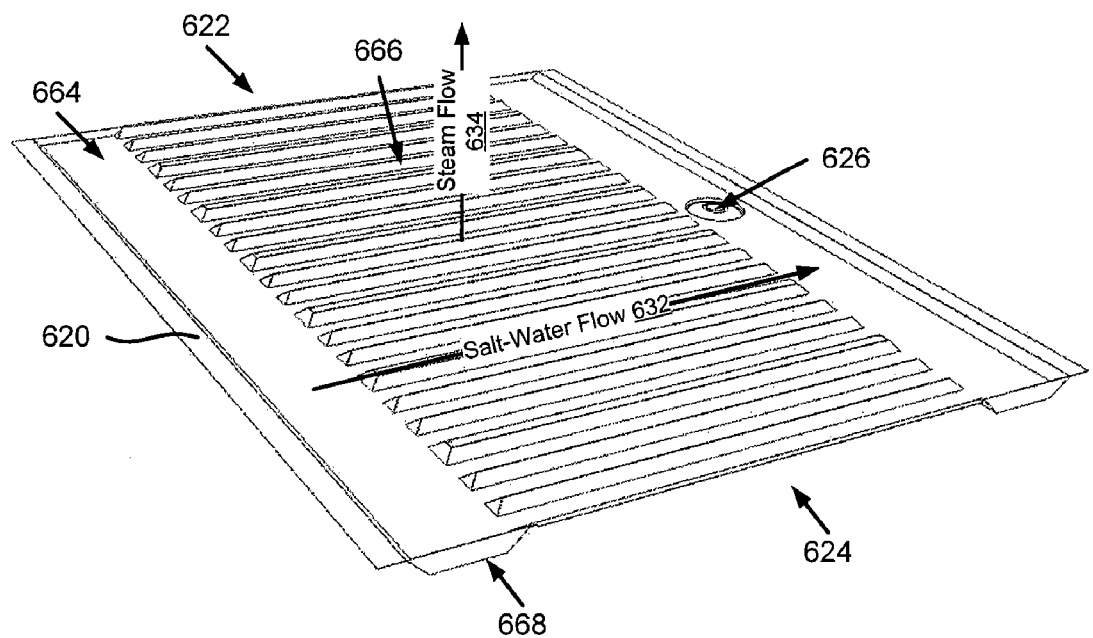
FIG. 6C is a perspective view of a heat-transfer element of FIG. 6A with salt-water, according to an embodiment of the invention.

Perspective views of the heat-transfer element 620 are shown in FIGS. 6B and 6C. FIG. 6B illustrates the heat-transfer element 620 (also shown in FIG. 6A) without salt-water and FIG. 6C illustrates the heat-transfer element 620 (also shown in FIG. 6A) with salt-water 664. The salt-water 664, which has a concentration that increases as it passes over a corrugated portion 666 of the heat-transfer element 620 until it reaches a brine concentration, exits out of opening 626. The salt-water 664 intersects at a zero-depth point between nearly every furrow and ridge of the corrugated portion 666. At the deepest point of each furrow, a depth of the salt-water 664 can be, for example, a few inches or less. In this embodiment, the incoming salt-water 631 (shown in FIG. 6A) is pumped into a reservoir 668 of the heat-transfer element 620, so that the salt-water 664 can be evenly distributed over the corrugated portion 666 of the heat-transfer element 620. The reservoir 668 can be referred to as a distribution reservoir.

Figure 6D:
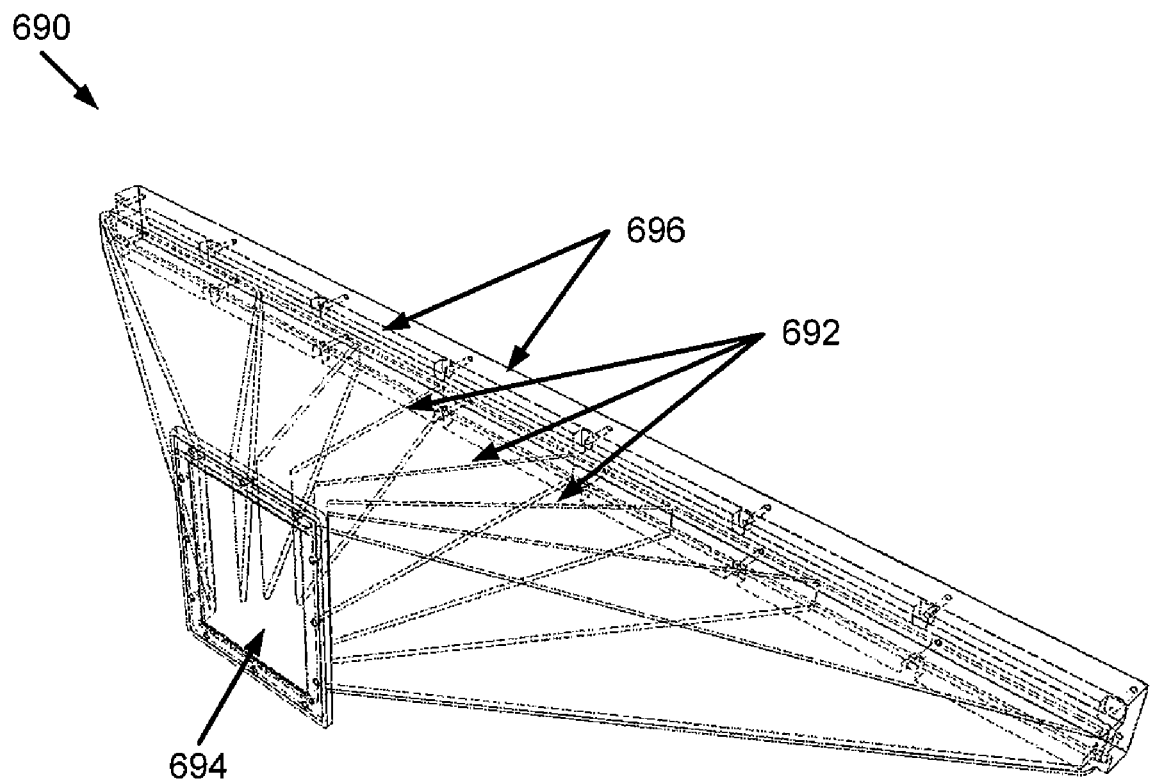
FIG. 6D is a perspective, transparent view of a distribution component, according to an embodiment of the invention.

Referring back to FIG. 6A, the brine 636 exits out of the housing 680 of the distillation system 600 via outlet 676. After the steam 634 is compressed, the compressed steam 638 is injected towards a bottom portion 624 of the heat-transfer element 620 via slots 652 into a middle portion 650 of the housing 680. The compressed steam 638 is distributed into the slots 652 using the distribution manifold 690 shown in FIG. 6D. As shown in FIG. 6D, the distribution manifold 690 has an inlet 694, and outlet slots 696 that correspond to slots 652 (shown in FIG. 6A). The compressed steam 638 is distributed to the slots 652 via the manifold system 692 of the distribution manifold 690. In some embodiments, the distribution manifold 690 can be referred to as a distribution component.

Referring back to FIG. 6A, the compressed steam 638 is further directed by the channeling system 644 of distribution component 630. In some embodiments, a horizontal plane 646 of the distribution component 646 can have multiple openings (e.g., orifices) to direct the compressed steam 638 towards the bottom surface 624 of the heat-transfer element 620 (in the direction of arrow 648) after the compressed steam 638 is injected into the housing 680. After the compressed steam 638 condenses at the bottom portion 624 of the heat-transfer element 620, the condensed fresh water 662 is collected in reservoir 660.

Figure 7A:
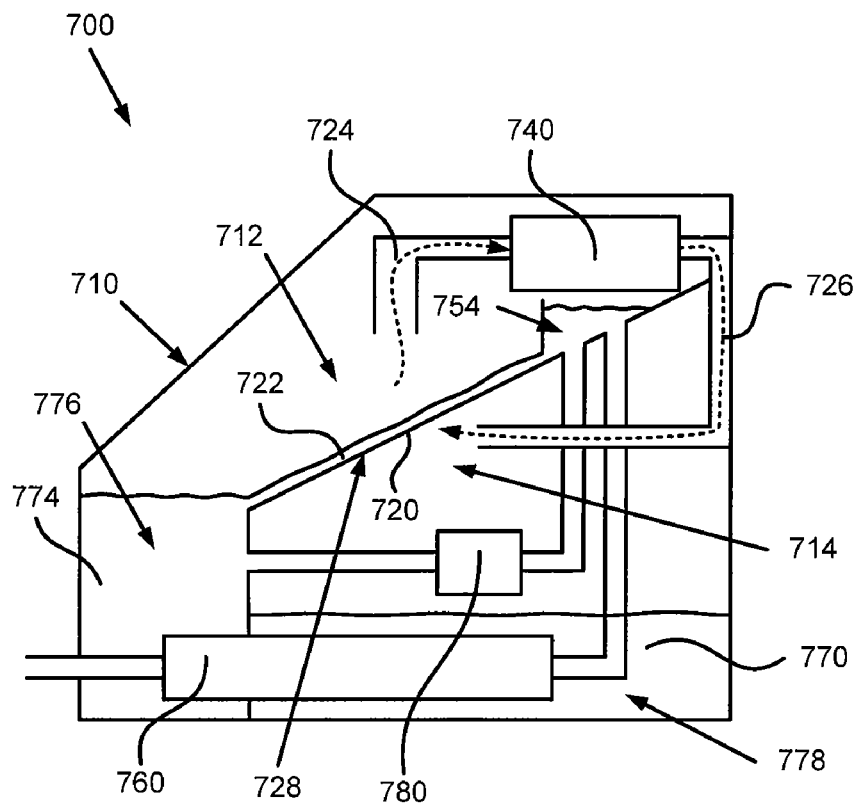
FIG. 7A is a schematic diagram that illustrates a distillation system, according to an embodiment of the invention.

FIG. 7A is a schematic diagram that illustrates a distillation system 700, according to an embodiment of the invention. The distillation system 700 has a housing 710 that includes a heat exchanger 760, compression component 740, and a heat-transfer element 720. The housing 710 has a portion that functions as a boiler 712 and a portion that functions as a condenser 714.

As shown in FIG. 7A, salt-water 722 flows down (e.g., pulled by gravity) the heat-transfer element 720 from a salt-water reservoir 754 to brine 774 in a brine reservoir 776. As the salt-water 722 flows down the heat-transfer element 720, fresh water is boiled from the salt-water 722 as fresh steam and moved 724 into the compression component 740 (shown as line 724). The fresh steam is compressed into compressed steam (e.g., compressed fresh steam) at the compression component 740 and moved towards a bottom surface 728 of the heat-transfer element 720 where the compressed steam condenses (shown as line 726). Heat released from the phase transition at the bottom surface 728 of the heat-transfer element 720 is transferred via the heat-transfer element 720 to the flowing salt-water 722 to cause fresh steam to boil from the flowing salt-water 722. In some embodiments, the distillation system 700 can have a distribution component (not shown) configured to facilitate distribution of compressed steam against the bottom surface 728 of the heat-transfer element 720. After the compressed steam condenses into fresh water, the fresh water 770 is collected in a fresh water reservoir 778.

Figure 7B:
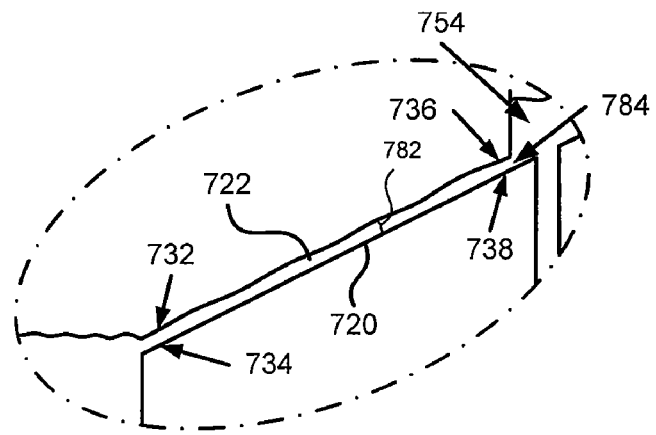
FIG. 7B is a schematic diagram of a portion of the distillation system shown in FIG. 7A, according to an embodiment of the invention.

FIG. 7B is a schematic diagram of a portion of the distillation system 700 shown in FIG. 7A, according to an embodiment of the invention. As shown in FIG. 7B, a surface of the salt-water 722 flowing down the heat-transfer element 720 is substantially parallel to the slope of the heat-transfer element 720. Accordingly, the salt-water 722 can have a shallow depth 782 over substantially the entire length of the heat-transfer element 720. In some embodiments, the flow-rate of the salt-water 722 and depth 782 of the salt-water 722 can be determined by a level of salt-water in the salt-water reservoir 754 and/or a height of an opening 784 from the salt-water reservoir 754. In some embodiments, the flow-rate of the salt-water 722 can be controlled by the shape and/or slope of the heat-transfer element 720.

In some embodiments, the distillation system 700 (e.g., heat-transfer element 720, boiler 712, etc.) can be configured so that the vapor pressure of the salt-water 722 at points 732 and 736 (points at opposite ends of the heat-transfer element 720) during operation of the distillation system 700 can be substantially the same. Also, the flow-rate of the salt-water 722 over the heat-transfer element can be defined so that the static pressures at points 734 and 738 can be substantially the same and approximately equal to the pressure within the boiler 712. In other words, the depth 782 of the salt-water 722 can be defined so that that static pressure from the depth 782 of the salt-water 722 will be negligible, thus promoting boiling above a top surface of the heat-transfer element 720. For example, if the boiler 712 is configured to operate at a specified pressure substantially below a standard atmospheric pressure, the vapor pressure at points 732 and 736 can be substantially equal to the specified pressure, and the pressure at points 734 and 738 can be substantially the same as the specified pressure.

Referring back to FIG. 7A, a recycling pump 780 is configured to recycle at least a portion of the brine 774 by pumping the portion from the brine reservoir 776 into the salt-water reservoir 754. The portion of the brine 774 can then be subjected to the boiling process where additional fresh water can be extracted from the brine 774. Fresh water can be more effectively extracted by recycling some of the brine 774 especially if the brine 774 is not saturated with salt. In other words, a higher percentage of fresh water can be removed from the salt-water 722 than without the recycling.

In some embodiments, the recycling of the brine 774 using the recycling pump 780 can be performed in response to a signal indicating that additional fresh water can be extracted from the brine 776. For example, a sensor (not shown) and an associated control module (not shown) can be configured to activate and/or control the recycling pump 780 when it is determined that the salt concentration of the brine 774 is below a specified threshold value.

Figure 8:
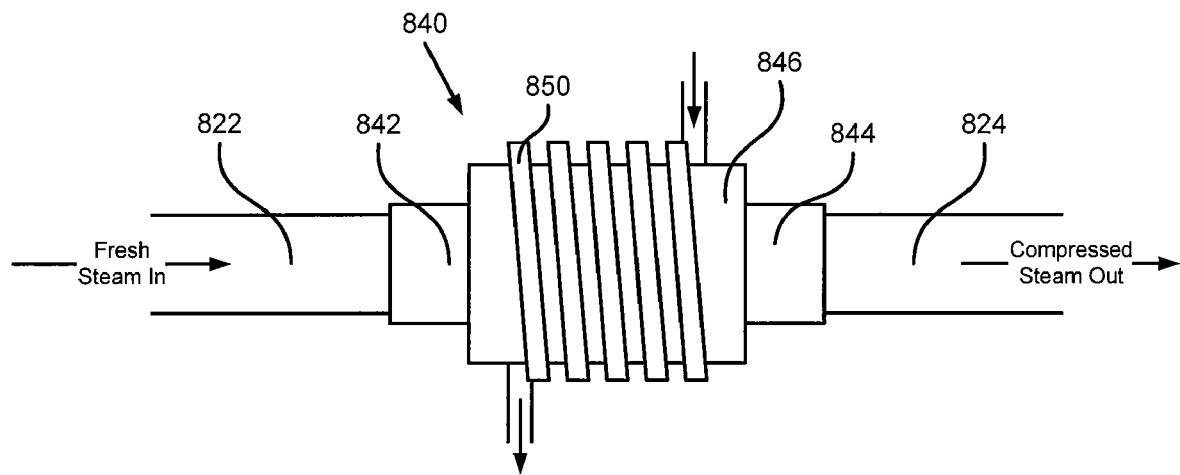
FIG. 8 is a schematic diagram of a compression component, according to an embodiment of the invention.

FIG. 8 is a schematic diagram of a compression component 840, according to an embodiment of the invention. The compression component 840 is configured to use heat from a waste stream 850 to compress fresh steam in a chamber 846 before moving the fresh steam towards a heat-transfer element (not shown) where energy from the fresh steam can be transferred upon condensation. The compression component 840 has an inlet valve 842 and an outlet valve 844 that are configured to operate in a coordinated fashion. The inlet valve 842 is opened while the outlet valve 844 is closed to allow fresh steam to enter and fill the chamber 846 of the compression component 840. After a specified period of time, the inlet valve 842 is closed and the fresh steam in the chamber 846 is heated to increase the temperature and/or the pressure of the fresh steam. After a specified period of time, the outlet valve 844 is opened and the steam is released to, for example, a condenser (not shown) of a distillation system.

Figure 9:
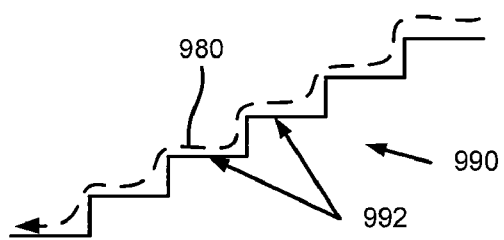
FIG. 9 is a schematic diagram of a heat-transfer element, according to an embodiment of the invention.

FIG. 9 is a schematic diagram of a heat-transfer element 990, according to an embodiment of the invention. The heat-transfer element 990 has several steps 992. The steps 992 of the heat-transfer element 990 can be configured to modify or define the flow-rate of salt-water 980 over the heat-transfer element 990 and/or heat-transfer characteristics of the heat-transfer element 990.

Figure 10A:
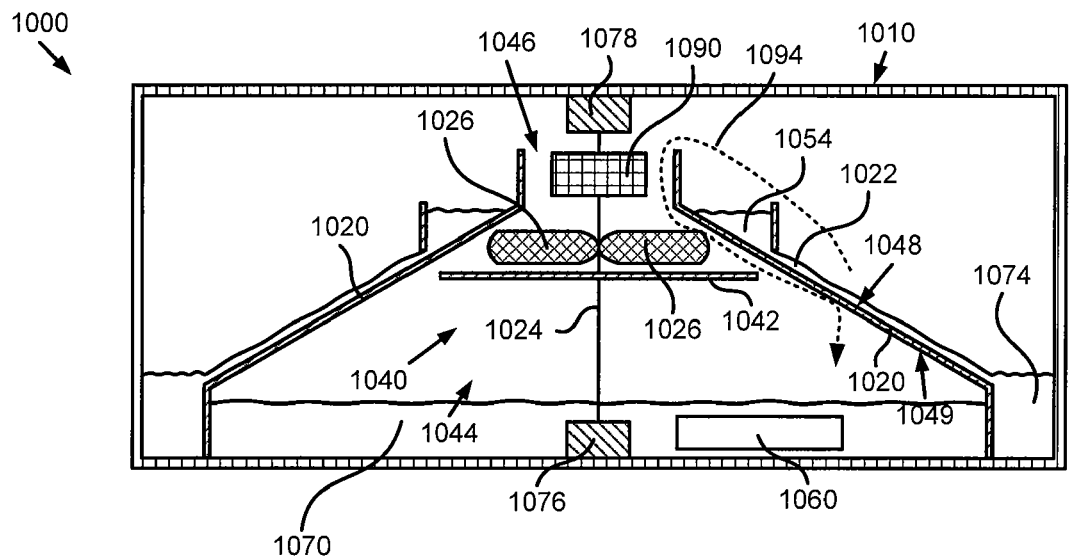
FIG. 10A is a schematic block diagram of a side cross-sectional view of a distillation system that has a substantially conical heat-transfer element, according to an embodiment of the invention.

FIG. 10A is a schematic block diagram of a side cross-sectional view of a distillation system 1000 that has a substantially conical heat-transfer element 1020, according to an embodiment of the invention. The conical heat-transfer element 1020 has a top surface 1048 above which salt-water 1022 from a salt-water reservoir 1054 can be boiled. The fresh steam can be moved (as shown by line 1094) through an opening 1046 at a top portion of the conical heat-transfer element 1020 towards a bottom surface 1049 of conical heat-transfer heat element 1020 where the fresh steam can be condensed. The fresh steam can be moved by blades of a propeller 1026 driven by a motor 1090 disposed within a housing 1010 of the distillation system 1000. After the fresh steam is condensed into condensed water, the condensed water can be collected at (or below) the base 1044 of the conical heat-transfer element 1020 in a fresh water reservoir 1070. In some embodiments, the heat-transfer element 1020 can be configured similar to the heat-transfer element 990 illustrated in FIG. 9.

As shown in FIG. 10A, the propeller 1026 (which is a portion of a compression component 1040) rotates about a shaft 1024 (e.g., axis) extending from the opening 1046 to the base 1044. The shaft 1024 is secured to the housing 1010 by two sets of bearings 1078 and 1076. Because the components of the compression component 1040 are entirely disposed within the housing 1010, seals and other components to prevent leakage are not needed in some embodiments. Also, much of the heat generated by the compression component 1040 can be used to pressurize and/or increase the temperature of fresh steam as it is moved (shown by line 1094) from outside of the conical heat-transfer element 1020 to a portion within the conical heat-transfer element 1020.

Also as shown in FIG. 10A, a heat exchanger 1060 can be used to transfer heat from the fresh water reservoir to incoming salt-water (not shown) being moved to the salt-water reservoir 1054. In some embodiments, the heat-exchanger 1060 can be configured to utilize energy from outside of the distillation system 1000 (e.g., solar energy). High concentration salt-water and/or brine are collected in a brine reservoir 1074.

Figure 10B:
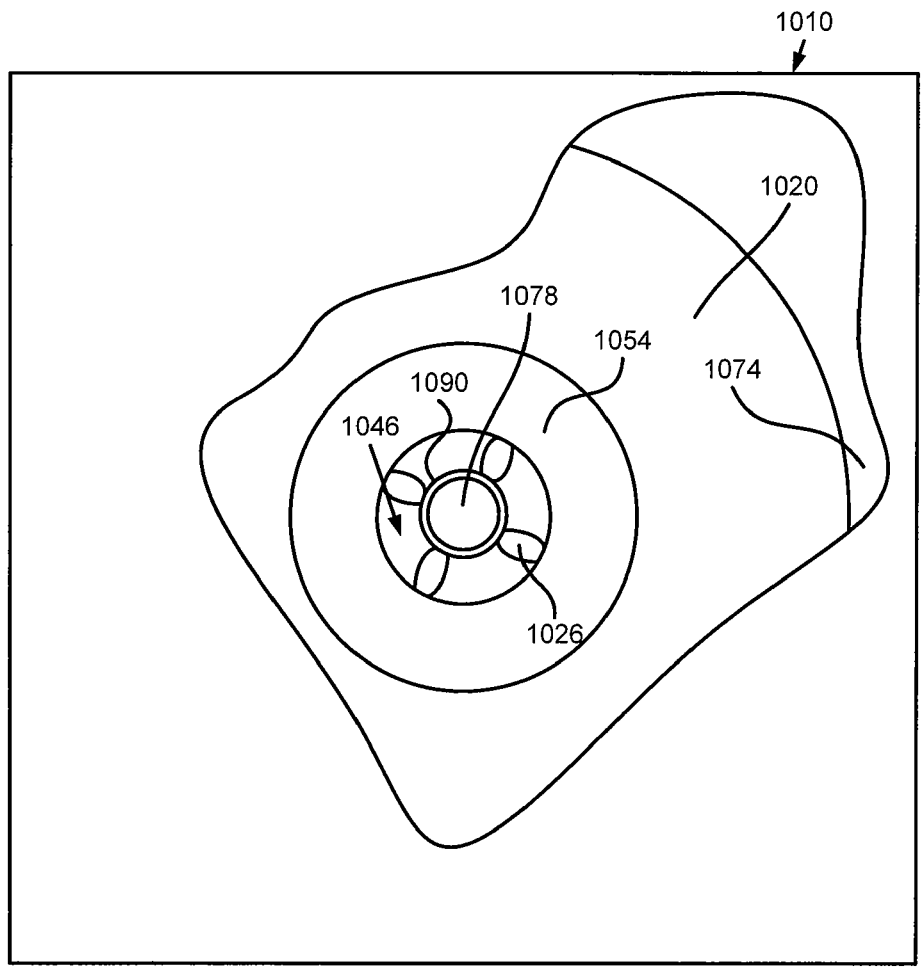
FIG. 10B is a schematic block diagram of a top partial cut-away view of the distillation system shown in FIG. 10A, according to an embodiment of the invention.

FIG. 10B is a schematic block diagram of a top partial cut-away view of the distillation system 1000 shown in FIG. 10A, according to an embodiment of the invention. As shown in FIG. 10B, the heat-transfer element 1020 is a substantially circular heat-transfer element 1020. In some embodiments, the heat-transfer element 1020 can be semi-circular or a different shape (e.g., pentagonal, octagonal). In some embodiments, the housing 1010 can also have a different shape than that shown in FIG. 10B (e.g., round, circular, triangular).

Figure 11:
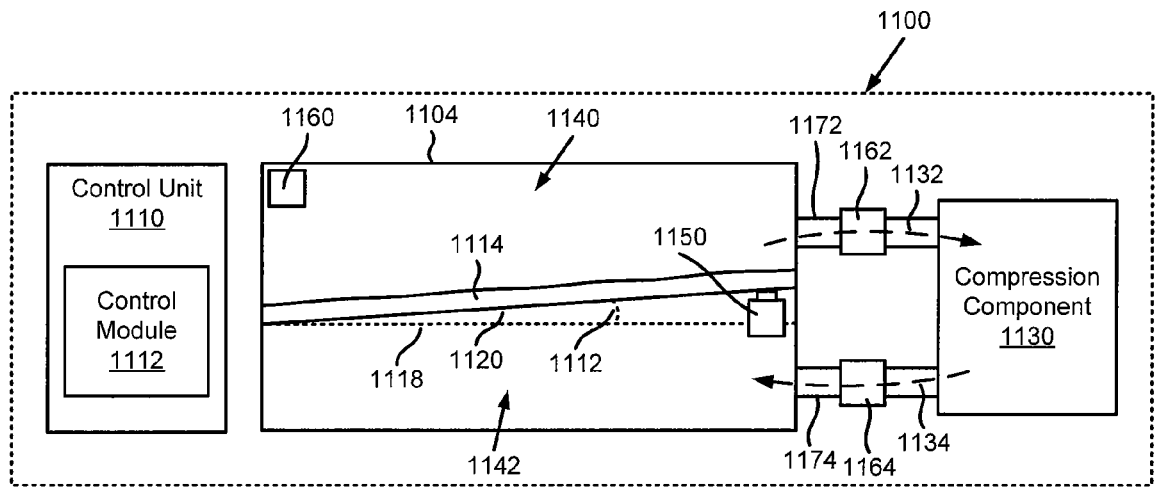
FIG. 11 is a schematic block diagram of a distillation system that includes a control unit, according to an embodiment of the invention.

FIG. 11 is a schematic block diagram of a distillation system 1100 that includes a control unit 1110, according to an embodiment of the invention. The distillation system 1100 has a heat-transfer element 1120 defining at least a portion of a boiler 1140 and at least a portion of a condenser 1142. The distillation system 1100 also has a compression component 1130, an actuator 1150 coupled to the heat-transfer element 1120, an outlet valve 1162 coupled to an outlet 1172, and an inlet valve 1164 coupled to an inlet 1174. The outlet 1172 is an outlet from a housing 1104 and the inlet 1174 is an inlet into the housing 1104. The outlet valve 1162 and the inlet valve 1164 can each have an actuator configured to modify flow.

The control unit 1110 is configured to control (e.g., change, modify, trigger a change) one or more portions or functions of the distillation system 1100 in response to a signal from a sensor 1160. The control unit 1110 can be configured to control the distillation system before, after, or during operation of the distillation system 1100. The control unit 1110 can be configured control the distillation system 1100 based a control module 1112 of the control unit 1110. For example, the control unit 1110 can be configured to implement a start-up sequence. The control module 1112 can include one or more hardware modules (e.g., firmware, digital signal processor) and/or one or more software modules (e.g., instructions, software programs) that can be based on one or more instructions (e.g., computer programs, algorithms). The control module 1112 can include one or more memory portions (not shown) and/or one or more processing portions (not shown).

The control unit 1110 can be configured to control at least a portion of the distillation system 1100 based on a control algorithm (e.g., control procedure) such as a feedback algorithm and/or a feed-forward algorithm. The control algorithm can be based on any combination of proportional control, derivative control, and/or integral control. The control unit 1110 can be configured to control at least a portion of the distillation system 1100 based on historical data associated with the distillation system 1100. The historical data can be stored in response to an instruction from the control unit 1110 and can be stored in a database (not shown) that can be accessed by the control unit 1110.

The sensor 1160 can include one or more of, for example, a temperature sensor, a pressure sensor, a humidity sensor, a flow-rate sensor, an electromagnetic radiation sensor, and so forth. Although one sensor 1160 is shown in this embodiment, in some embodiments, a distillation system 1100 can have many sensors (not shown) in various portions of the distillation system 1100. For example, a sensor (not shown) can be coupled to the heat-transfer element 1120, a sensor (not shown) can be disposed within the condenser 1142, and/or a sensor (not shown) can be disposed within the compression component 1130. In some embodiments, at least a portion of the sensor 1160 (or another sensor) can be disposed outside of the housing 1104 of the distillation system.

The control unit 1110, for example, can be configured to modify an angle 1112 of the heat-transfer element 1120 with respect to a horizontal plane 1118 in response to a signal from the sensor 1160. The control unit 1110 can change the slope of the heat-transfer element 1120 by sending a signal that triggers movement of the actuator 1150 coupled to the heat-transfer element 1120. The signal can be sent from the control unit 1110 when one or more conditions are satisfied (e.g., threshold condition is satisfied). In some embodiments, a flow-rate of fluid 1114 can be modified when the angle 1112 is changed. In some embodiments, the control unit 1110 can be configured to modify a rate of heat-transfer rate of the heat-transfer element 1120 based on a signal from the sensor 1160. The heat-transfer rate can be calculated at the control unit 1110 based on one or more signals from sensor 1160 (and/or another sensor) of the distillation system 1100.

The control unit 1110 can be configured to modify a flow-rate of the outlet 1172 and/or a flow-rate of the inlet 1174 based on a signal from the sensor 1160 (or another sensor (not shown)) by changing valve 1162 and/or valve 1164, respectively. For example, if the rate of boiling, pressure, and/or temperature of a fluid 1114 above the heat-transfer element 1120 is below a threshold value as determined by the control unit 1110 based on a signal from the sensor 1160, the control unit 1110 can change the flow-rate (shown as line 1132) via outlet 1172 by moving a portion of valve 1162. Likewise, if the rate of boiling, pressure, and/or temperature of a fluid 1114 above the heat-transfer element 1120 satisfies a condition as determined by the control unit 1110 based on a signal from the sensor 1160, the control unit 1110 can change the flow-rate (shown as line 1134) via inlet 1174 by moving a portion of valve 1164.

In some embodiments, the control unit 1130 can be configured to modify the output and/or input (e.g., input temperature, input pressure, output temperature, output pressure) of the compression component 1130 in response to a signal from the sensor 1160. For example, the control unit 1130 can be configured to modify a speed of a motor (not shown) of the compression component 1130 when a condensation rate, a pressure, and/or a temperature below the heat-transfer element 1120 satisfies a threshold condition. In some embodiments, the control unit 1130 can be configured to modify the output and/or input of the compression component 1130 when a fresh water production rate and/or compressed steam production rate are below a specified limit.

In some embodiments, the control unit 1110 can be configured to modify a flow-rate of a fluid into the housing 1104 from a reservoir (not shown) disposed outside of the housing 1104. In some embodiments, the control unit 1110 can be configured to modify a flow-rate, a temperature, and/or a pressure of a fluid within the housing 1104 from a reservoir (not shown) disposed within the housing 1104. In some embodiments, the control unit 1110 can be configured to modify a flow-rate, a temperature, and/or a pressure of a waste product (e.g., brine) within and/or outside of the housing 1104.

The control unit 1110, in some embodiments, can be configured to modify a portion of the distillation system 1100 (e.g., slope of heat-transfer element 1120, flow-rate of a fluid) so that a temperature within the boiler 1140 (e.g., at or above the heat-transfer element 1120) and a temperature within the condenser 1142 (e.g., at or below the heat-transfer element 1120) are separated by a specified interval. In some embodiments, the control unit 1110 can be configured to modify a portion of the distillation system 1100 (e.g., slope of heat-transfer element 1120, flow-rate of a fluid) so that a pressure within the boiler 1140 and a pressure within the condenser 1142 are separated by a specified interval.

In some embodiments, multiple components associated with the distillation system 1100 can be modified in a coordinated fashion (e.g., simultaneously, serially) to achieve a desired result. For example, if the boiling rate above the heat-transfer element 1120 is below a specified (e.g., desirable) level, the flow of fluid boiled from fluid 1114 can be increased by modifying the angle 1112 of the heat-transfer element 1120 to increase the flow-rate of fluid 1114 and by increasing the speed of a motor of the compression component 1130. In some embodiments, the control unit 1110 can be configured to control one or more portions of multiple distillation systems (not shown) through a wired network and/or wireless network.

In some embodiments, the distillation system 1100 can have a user-interface (not shown) that can be used by a user to manually change an aspect of the distillation system 1100. For example, a user can change a flow-rate of a fluid associated with the distillation system 1100 or a heat-transfer rate of the heat-transfer element 1120 via the user-interface. In some embodiments, a user can change an operating point of one or more portions of the distillation system 1100 via a user-interface. The control unit 1110 can be configured to modify, for example, a flow-rate and/or an angle of the heat-transfer element 1120 to implement the operating point change.

In some embodiments, for example, a heating component (not shown), such as an electric heater, can be temporarily used during a transition to a particular operating point of at least a portion of the distillation system 1100. For example, if the operating temperature of the boiler portion 1140 were increased, a heating component can be used to temporarily heat an incoming salt-water stream (not shown) until a steady-state condition is attained. In some embodiments, a heating component can be permanently used to maintain a steady-state condition of a portion of the distillation system 1100.

Figure 12:
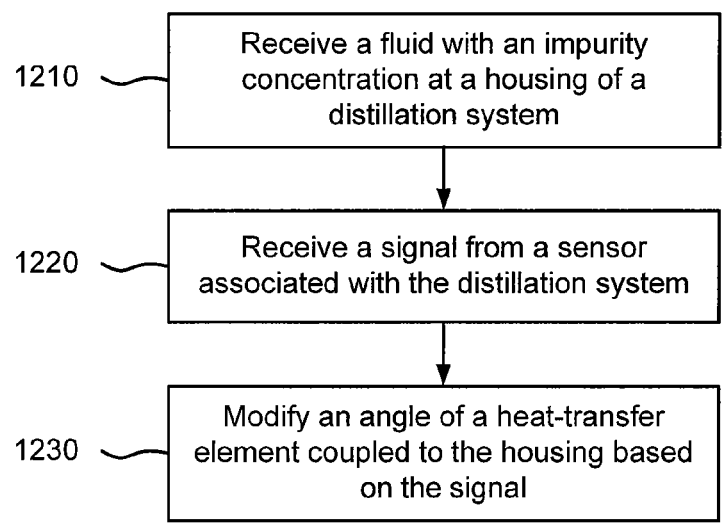
FIG. 12 is a flowchart that illustrates a method for modifying an angle of a heat-transfer element of a distillation system, according to an embodiment of the invention.

FIG. 12 is a flowchart that illustrates a method for modifying an angle of a heat-transfer element of a distillation system, according to an embodiment of the invention. The flow chart shows that a fluid with an impurity concentration is received at a housing of a distillation system at 1210. A signal from a sensor associated with the distillation system received at 1220. In some embodiments, the sensor can be a temperature sensor or a pressure sensor.

An angle of a heat-transfer element coupled to the housing is modified based on the signal at 1230. For example, when a threshold condition is satisfied based on the signal, a control unit can trigger an actuator to change the angle of the heat-transfer element. In some embodiments, a flow-rate of at least a portion of a fluid can also be modified in addition to, or in place of, the angle of the heat-transfer element being modified.

Figure 13:
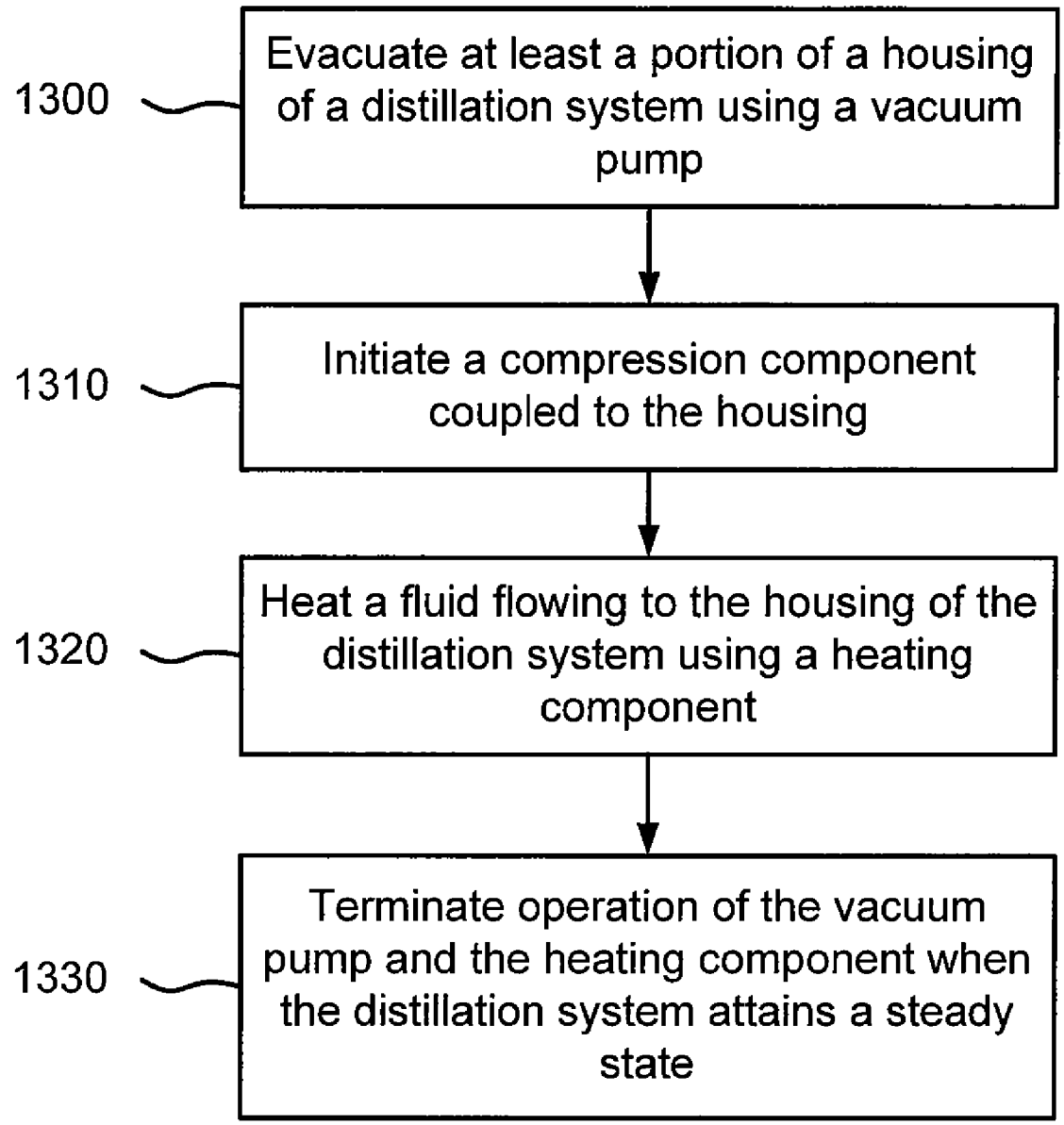
FIG. 13 is a flowchart that illustrates a method for initiating a distillation system, according to an embodiment of the invention.

FIG. 13 is a flowchart that illustrates a method for initiating a distillation system, according to an embodiment of the invention. The flowchart illustrates that at least a portion of a housing of a distillation system is evacuated using a vacuum pump at 1300. The housing of the distillation system, in some embodiments, must be evacuated if one or more portions of the distillation system are configured to operate at a low pressure. In some embodiments, the vacuum pump is not necessary because the distillation system is configured to operate at, for example, atmospheric pressure. In some embodiments, a blower is needed to increase a pressure of the distillation system to a high pressure operating point.

A compression component coupled to the housing is initiated at 1310. A fluid flowing to the housing of the distillation system is heated using a heating component at 1320. The fluid can be a mixture of two or more substances. In some embodiments, the fluid can be heated to an operating temperature of a boiler portion of the distillation system. In some embodiments, the heating component can be, for example, an electric heating component only used during start-up. In some embodiments, a cooling component is needed to decrease a temperature of an incoming and/or outgoing stream of the distillation system to a low temperature operating point.

The operation of the vacuum pump and the heating component are terminated when the distillation system attains steady-state at 1330. In some embodiments, the distillation system operates at steady state when a boiler portion of the distillation system and a condenser portion of the distillation system reach their respective operating points. At the steady-state operating point, a heat-transfer rate of a heat-transfer element disposed within the housing of the distillation system is substantially constant.

Some embodiments relate to a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as floptical disks; carrier wave signals; and hardware devices that are specially configured to store and execute program code, such as application specific integrated circuits (ASICs), Programmable Logic Devices (PLDs), and ROM and random-access memory (RAM) devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, methods and apparatus for distillation over a wide range of temperatures and pressures are described. While various embodiments have been described above, it should be understood that they have been presented by way of example only, and various changes in form and details may be made. For example, any combination of the components in the distillation systems shown in the figures can be used to create a different and/or separate distillation system. In some embodiments, for example, some of the components of the distillation system shown in FIG. 2 can be combined with the distillation systems shown in FIGS. 10A and 11.

What is claimed is:

1. An apparatus, comprising:
a housing assembly defining a first reservoir and a second reservoir, the first reservoir configured to receive a first volume of fluid in a substantially liquid state, the first volume of fluid including a first impurity concentration, the housing assembly including a condenser portion and a boiler portion;
a heat-transfer element coupled to the housing assembly and defining at least a portion of the condenser portion and at least a portion of the boiler portion, the heat-transfer element positioned such that the first volume of fluid flows across a surface of the heat-transfer element within the boiler portion from the first reservoir towards the second reservoir, the heat-transfer element configured to transfer heat from the condenser portion to the boiler portion such that a first portion of the fluid flowing across the surface is boiled within the boiler portion and a second portion of the fluid is conveyed into the second reservoir, the second portion of the fluid including a second impurity concentration higher than the first impurity concentration;
a compression component fluidically coupled to the boiler portion of the housing assembly and the condenser portion of the housing assembly, the compression component configured to produce a pressure differential between the boiler portion and the condenser portion to move the first portion of fluid from the boiler portion to the condenser portion; and
a pump configured to pump a portion of a second volume of the fluid from the second reservoir into the first reservoir.

2. The apparatus of claim 1, further comprising:
a heat exchanger disposed at least partially in the second reservoir, the heat exchanger configured to transfer heat from the second volume of fluid within the second reservoir to an inlet flow of fluid flowing into the first reservoir.

3. The apparatus of claim 1, wherein:
the surface of the heat-transfer element is a first surface, the heat-transfer element including a second surface opposite the first surface; and
the compression component is configured to move the first portion of fluid into the condenser portion such that a latent heat from the first portion of fluid is transferred via the heat-transfer element into the first volume of fluid flowing across the first surface of the heat-transfer element within the boiler portion when the first portion of fluid is changed into the liquid phase at the second surface of the heat-transfer element within the condenser portion.

4. The apparatus of claim 1, wherein at least one of a portion of the heat-transfer element has a conical shape.

5. The apparatus of claim 1, further comprising:
a heating mechanism configured to heat the first volume of fluid before the first volume of fluid is received by the first reservoir.

6. The apparatus of claim 1, further comprising:
a degassing system configured to degas the first volume of fluid.

7. The apparatus of claim 1, further comprising:
a controller configured to control a flow rate of the portion of the second volume produced by the pump in response to an impurity concentration of the second volume of the fluid.

8. The apparatus of claim 1, wherein the first reservoir substantially surrounds the compression component.

9. The apparatus of claim 1, further comprising:
a controller configured to control a flow rate of the first volume of the fluid flowing across the surface of the heat-transfer element.

10. The apparatus of claim 1, wherein the heat-transfer element positioned such that the flow of the first volume of the fluid across the surface of the heat-transfer element is induced by gravity.

11. An apparatus, comprising:
a housing defining a reservoir configured to receive a volume of fluid in a substantially liquid state, at least a portion of the fluid includes a dissolved substance, the housing including a condenser portion and a boiler portion;
a degassing system configured to degas the volume of fluid;
a heat-transfer element disposed within an interior volume of the housing and configured to transfer a latent heat to a first portion of the volume of fluid disposed on a top surface of the heat transfer element such that a vapor pressure of the first portion is substantially equal to a pressure within the boiler portion, the latent heat being produced by a second portion of the volume of fluid within the condenser portion when the second portion contacts a bottom surface of the heat transfer element and condenses; and
a compression component configured to produce a pressure differential between the boiler portion and the condenser portion to move the second portion of fluid from the boiler portion to the condenser portion.

12. The apparatus of claim 11, wherein:
the heat-transfer element defines an opening placing the condenser portion in fluid communication with the boiler portion; and
the compression component is configured to move the second portion from the boiler portion to the condenser portion via the opening.

13. The apparatus of claim 11, further comprising:
a vacuum pump coupled to the housing and configured to decrease the pressure within the boiler portion to a pressure substantially below a standard atmospheric pressure.

14. The apparatus of claim 11, further comprising:
a heating element coupled to the housing and configured to heat the volume of fluid in the reservoir; and
an ultrasonic transducer coupled to the housing and configured to convey ultrasonic energy into the volume of the fluid.

15. The apparatus of claim 11, wherein at least a portion of the heat-transfer element is disposed at an angle with respect to a horizontal plane.

16. The apparatus of claim 11, wherein the degassing system includes an ultrasonic transducer.

17. An apparatus, comprising:
a housing including a separation section and a condenser section, the housing defining a first reservoir and a second reservoir, the first reservoir being configured to receive a mixture of a first substance and a second substance;
a heat-transfer element coupled to the housing and defining at least a portion of the separation section and at least a portion of the condenser section, the heat-transfer element positioned such that the mixture flows across a surface of the heat-transfer element within the separation section from the first reservoir, the heat-transfer element configured to transfer heat from the condenser section to the separation section to produce a first phase change of a portion of the first substance to separate the portion the first substance from the mixture, the heat-transfer element positioned such that a remaining portion of the mixture flows into the second reservoir;
a compression component coupled to the separation section and configured to produce a pressure differential between the separation section and the condenser section to move the portion of the first substance from the separation section to the condenser section after the portion of the first substance is separated from the mixture; and
a pump configured to pump a portion of the remaining portion of the mixture from the second reservoir into the first reservoir.

18. The apparatus of claim 17, wherein:
the heat-transfer element is configured to produce a second phase change in the portion of the first substance when the portion of the first substance is within the condenser section, the second phase change producing the heat transferred via the heat-transfer element from the from the condenser section to the separation section; and
a quantity of the heat associated with the first phase change is substantially equal to a quantity of the heat associated with the second phase change.

19. The apparatus of claim 17, wherein at least a portion of the heat-transfer element is disposed at an angle with respect to a horizontal plane.

20. The apparatus of claim 17, further comprising:
a degassing system configured to degas the mixture.

21. The apparatus of claim 17, further comprising:
a controller configured to control a flow rate of the remaining portion of the mixture produced by the pump in response to an impurity concentration of the remaining portion of the mixture.

22. An apparatus, comprising:
a housing having at least an inlet reservoir and a brine collection portion, the housing being configured to receive a volume of salt-water in the inlet reservoir, the housing including a condenser portion and a boiler portion;
a heat-transfer element coupled to an interior volume of the housing, the heat-transfer element including a surface, at least a portion of which is disposed at an angle with respect to a horizontal plane such that a portion of the volume of salt-water flows on the surface of the heat-transfer element from the inlet reservoir toward the brine collection portion via a gravity-feed mechanism, the heat-transfer element configured to transfer latent heat to the salt-water such that a portion of water is boiled from the salt-water and a salt concentration of the salt-water is increased, the brine collection portion configured to receive the salt-water after the salt concentration of the salt-water is increased;

a compression component configured to produce a pressure differential between the boiler portion and the condenser portion to to-move the portion of water from the boiler portion to the condenser portion; and a pump configured to pump a portion of the salt-water having an increased salt concentration from the brine collection portion into the inlet reservoir.

* * * * *

UNITED STATES PATENT AND TRADEMARK OFFICE
CERTIFICATE OF CORRECTION

PATENT NO. : 8,202,401 B2  
APPLICATION NO. : 11/936657  
DATED : June 19, 2012  
INVENTOR(S) : David Taylor et al.

Page 1 of 1

It is certified that error appears in the above-identified patent and that said Letters Patent is hereby corrected as shown below:

In the Claims:

Claim 18, column 20, lines 42 and 43, change "from the from the condenser" to -- from the condenser --.

Signed and Sealed this
Eighth Day of October, 2013

Teresa Stanek Rea
*Deputy Director of the United States Patent and Trademark Office*